E. K. KING.
HEADLIGHT.
APPLICATION FILED NOV. 23, 1914.

1,135,456.

Patented Apr. 13, 1915.

Witnesses
Robert M. Sutphen
A. J. Hind

Inventor
E. K. King
By Watson E. Coleman
Attorney

UNITED STATES PATENT OFFICE.

EDWARD K. KING, OF HAMILL, SOUTH DAKOTA.

HEADLIGHT.

1,135,456.

Specification of Letters Patent.

Patented Apr. 13, 1915.

Application filed November 23, 1914. Serial No. 873,554.

*To all whom it may concern:*

Be it known that I, EDWARD K. KING, a citizen of the United States, residing at Hamill, in the county of Tripp and State of South Dakota, have invented certain new and useful Improvements in Headlights, of which the following is a specification, reference being had to the accompanying drawings.

This invention relates to certain improvements in headlights and has relation more particularly to a device of this general character especially designed and adapted for use in connection with automobiles; and an object of the invention is to provide novel and improved means whereby a headlight may be supported at substantially the transverse center of the vehicle and in advance of the radiator.

Furthermore, it is an object of the invention to provide a headlight having novel and improved means coacting with the fenders and radiator of an automobile whereby the headlight is maintained in operative position.

The invention consists in the details of construction and in the combination and arrangement of the several parts of my improved headlight whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1:
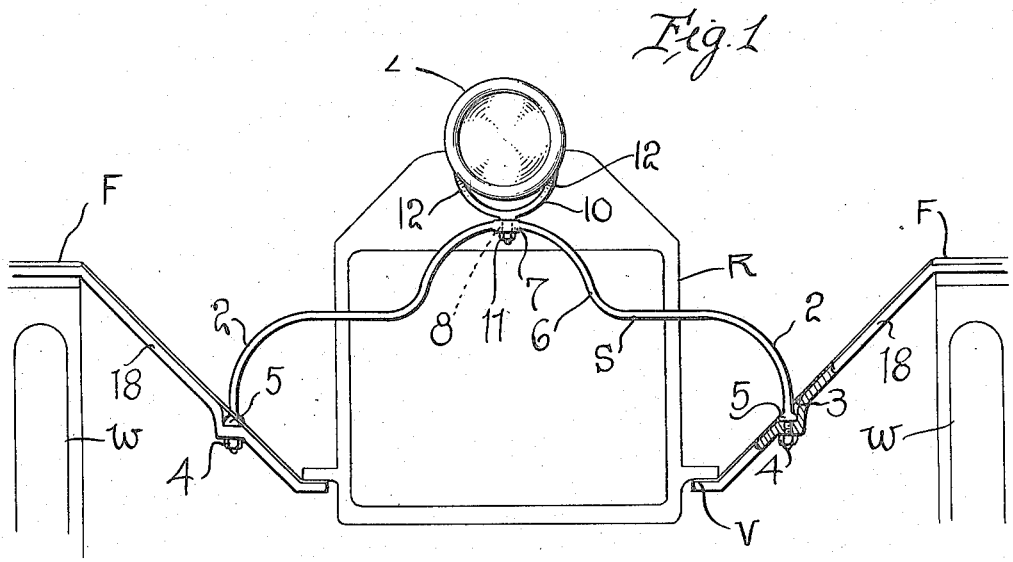
Figure 2:
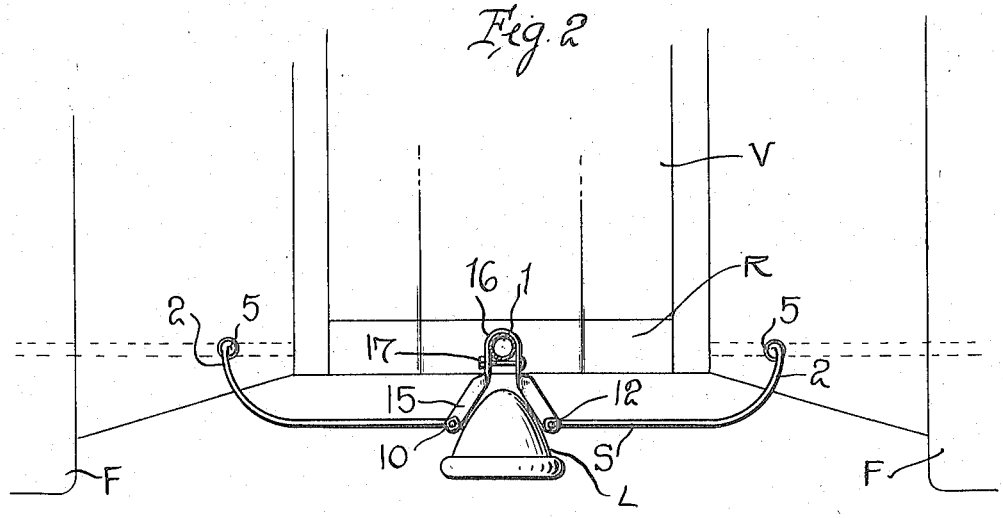
Figure 3:
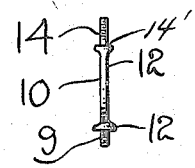

Figure 1 is an elevational view of a headlight constructed in accordance with an embodiment of my invention and in applied position; Fig. 2 is a top plan view of the device as disclosed in Fig. 1; and Fig. 3 is a side elevational view, detached, of the lamp bracket as herein embodied.

As disclosed in the accompanying drawings, R denotes a radiator of conventional form and including the upstanding neck or filling vent 1, and F denotes conventional fenders overlying the forward wheels W of the vehicle V, herein disclosed as an automobile of conventional type.

S denotes a support substantially in the form of a V, the extremities 2 whereof being threaded and adapted to be disposed through suitable openings 3 produced in the fenders F and said threaded extremities 2 have coacting therewith conventional clamping bolts or nuts 4 which in connection with the shoulders 5 formed upon the support S adjacent the inner extremities of the threaded portions 2 thereof serve to effectually maintain the support S in applied position, as is believed to be clearly shown in the accompanying drawings.

The support S is produced from any suitable material possessing the requisite rigidity and the stems 6 of the support are disposed on such curvature as to position the apex 7 of the support S a predetermined distance in advance of the radiator R and at substantially the transverse center of the vehicle V. The intermediate portion or apex 7 of the support S is disposed substantially horizontally and is provided with an opening 8 through which is adapted to be disposed the threaded shank 9 of the lamp bracket 10, said shank 9 having coacting therewith a conventional nut or bur 11 which coacts with the annular shoulder 12 formed upon the bracket 10 adjacent the inner end of the shank 9 to effectively hold or clamp the lamp bracket 10 in applied position.

As herein disclosed, the lamp bracket 10 includes the forks 12 to which the lamp L, of any conventional style, is adapted to be affixed and the upper extremities of the forks 12 are threaded, as indicated at 14, and each fork 12 adjacent the inner extremity of the threaded portion 14 is provided with an annular shoulder 14' with which is adapted to contact an extremity of a brace arm 15, said brace arm 15 being provided with a perforation through which the threaded portion 14 of the fork is adapted to project. Coacting with the threaded portion 14 is a conventional nut or bur, for a purpose which is believed to be self-evident.

The inner extremities of the brace arms 15 are integrally tied or connected by the resilient band 16 adapted to surround the neck 1 of the radiator, and coacting with said band adjacent the inner ends of the arms 15 is a conventional clamping means 17, herein disclosed as a headed threaded member suitably disposed through the band 16 at a predetermined point and having coacting therewith a conventional nut or bur 18.

While I have hereinbefore stated that the extremities 2 of the support S are secured to the fenders F, it may be well to state that such connection is with the fender supports 18, although in referring to the fenders F hereinbefore and in the appended claims, I wish to be understood as including the supports 18.

From the foregoing description, it is thought to be obvious that a headlight constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with a vehicle including fenders, a support disposed across the vehicle in advance thereof and having its extremities secured to the fenders, and a lamp bracket operatively engaged with the support intermediate the length thereof.

2. In combination with a vehicle including fenders, a support disposed across the vehicle in advance thereof and having its extremities secured to the fenders, a lamp bracket operatively engaged with the support intermediate the length thereof, and brace means interposed between the lamp bracket and the vehicle for further supporting the lamp bracket.

3. In combination with a vehicle including a radiator having a neck and fenders, a support disposed in advance of the radiator and having its extremities secured to the fenders, a lamp bracket carried by the support, and a brace interposed between the neck of the radiator and the lamp bracket.

4. In combination with a vehicle including a radiator having a neck and fenders, a support disposed in advance of the radiator and having its extremities secured to the fenders, a lamp bracket carried by the support, said bracket being provided with forks, brace arms engaged with the forks of the lamp bracket, a band integrally connecting the adjacent ends of the arms and adapted to surround the neck of the radiator, and clamping means coacting with said band for securing the arms to the neck.

In testimony whereof I hereunto affix my signature in the presence of two witnesses.

EDWARD K. KING.

Witnesses:
ROBERT KING,
H. L. GREGERSEN.